(12) United States Patent
Bojsen

(10) Patent No.: US 9,848,537 B2
(45) Date of Patent: Dec. 26, 2017

(54) DRIVE SYSTEM FOR COMBINE HARVESTER PROCESSOR

(71) Applicant: AGCO International GmbH, Hesston, KS (US)

(72) Inventor: Thomas Mygind Bojsen, Randers (DK)

(73) Assignee: AGCO International GmbH, Neuhausen (CH)

(*) Notice: Subject to any disclaimer, the term of this patent is extended or adjusted under 35 U.S.C. 154(b) by 54 days.

(21) Appl. No.: 15/099,882

(22) Filed: Apr. 15, 2016

(65) Prior Publication Data

US 2016/0302361 A1    Oct. 20, 2016

(30) Foreign Application Priority Data

Apr. 15, 2015  (GB) .................................. 1506354.8
Sep. 15, 2015  (GB) .................................. 1516263.9

(51) Int. Cl.
*A01F 7/06* (2006.01)
*A01F 12/56* (2006.01)
*A01D 41/127* (2006.01)

(52) U.S. Cl.
CPC .......... *A01F 12/56* (2013.01); *A01D 41/1274* (2013.01); *A01F 7/06* (2013.01)

(58) Field of Classification Search
CPC ..... A01D 41/00; A01D 41/1274; A01F 12/56; A01F 7/06
USPC ...................... 460/68, 70; 56/16.5
See application file for complete search history.

(56) References Cited

U.S. PATENT DOCUMENTS

| 6,984,171 | B2* | 1/2006 | Brome | A01D 41/1274 460/59 |
| 7,632,179 | B2* | 12/2009 | Brome | A01D 41/127 460/1 |
| 8,781,694 | B1* | 7/2014 | Sheidler | A01D 41/1274 56/11.1 |
| 9,485,905 | B2* | 11/2016 | Jung | A01D 41/127 |
| 2015/0201560 | A1* | 7/2015 | Demirdzhi | A01D 69/005 460/116 |
| 2016/0044870 | A1* | 2/2016 | Mayerle | A01D 41/1243 460/112 |
| 2017/0094906 | A1* | 4/2017 | Bomleny | A01D 61/008 |

FOREIGN PATENT DOCUMENTS

JP   2013005783 A   2/2015
WO  2014/031036 A1  2/2014
WO  2014/136862 A1  9/2014

OTHER PUBLICATIONS

UK Intellectual Property Office, International Search Report for UK Priority Application No. 1506354.8, dated Sep. 11, 2015.

* cited by examiner

*Primary Examiner* — John G Weiss

(57) ABSTRACT

A combine harvester with an axial flow crop processor with a rotor mounted for rotation inside a rotor housing arranged longitudinally with respect to the harvester. A feed beater is mounted for rotation on a substantially transverse axis and serves to tangentially impel crop material into the crop processor. A drive system drives the rotor and feed beater, wherein the drive system includes a rotor drive device for transmitting torque from a drive stage to the rotor, and a drive connection between the rotor drive device and the beater.

13 Claims, 4 Drawing Sheets

DRIVE SYSTEM FOR COMBINE HARVESTER PROCESSOR

CROSS-REFERENCE TO RELATED APPLICATIONS

The present application claims the benefit of and priority from United Kingdom Applications No. 1506354.8, filed Apr. 15, 2015, and No. 1516263.9, filed Sep. 15, 2015, the disclosures of both being incorporated herein by reference.

FIELD OF INVENTION

The invention relates to drive systems for driving a crop processing system in a combine harvester, and particularly to a feed beater drive system. The feed beater is mounted for rotation on a substantially transverse axis and serves to tangentially impel crop material into an axial flow crop processor.

BACKGROUND OF THE INVENTION

For many decades self-propelled combine harvesters have been used by farmers to harvest a wide range of crops including cereals, maize and oil seed rape. Typically a combine harvester cuts the crop material, threshes the grain therefrom, separates the grain from the straw and cleans the grain before storing in an on-board tank. Straw and crop residue is ejected from the rear of the machine.

The crop processor of a combine harvester comprises threshing and separating apparatus. The separating apparatus is traditionally based upon one of two well-established systems. In a first known system straw walkers are used to 'walk' the crop stream rearwardly in the combine wherein agitation caused by this movement causes the grain to fall through an integrated grate whilst the straw residue falls from the rear and out of the combine. In the second alternative system one or two cylindrical rotors are mounted within the combine longitudinally and enclosed by rotor cages wherein crop fed in at the front by a tangential-flow impelling feed beater, travels rearwardly in an axially spiral motion due to interacting crop engaging elements fitted to the rotor tube and guide vanes fitted on the inside of the rotor cage. The cylindrical rotors can provide a threshing and separating action, or a separating action only. Separated grain falls through a grate in the cage whilst the straw residue is conveyed rearwardly and out of the machine. The invention is concerned with driving a feed beater in this second system of separating apparatus.

The feed beater is commonly driven by a belt-drive system comprising belts and pulleys, the beater drive typically comprising a power branch deriving its torque from a main drive system driven by an internal combustion engine. A clutch is typically included in the driveline to allow the operator to selectively engage and disengage the crop processing apparatus which includes, inter alia, the feed beater, the separating apparatus and a grain cleaning shoe.

Combine harvesters are utilized for harvesting a wide range of different crops. It is recognized that certain crops, such as corn or beans, can become damaged if the feed beater rotates too fast. Due to the feed beater being drivingly connected to the other crop processing systems or indeed the engine, it is not possible or practical for the operator to slow down the feed beater without affecting the other systems without the provision of a multi-ratio drive to the feed beater.

It is known to provide a stepped multi-ratio drive system for a feed beater but such systems involve many additional components and, as a result, are expensive. Moreover, changing the drive speed of the beater is cumbersome and cannot be done whilst the harvester is operating.

SUMMARY OF THE INVENTION

According to the invention there is provided a combine harvester comprising an axial flow crop processor with a rotor mounted for rotation inside a rotor housing on a substantially longitudinal axis with respect to the harvester, a feed beater mounted for rotation on a substantially transverse axis and serving to tangentially impel crop material into the crop processor, and a drive system for driving the rotor and feed beater, wherein the drive system includes a rotor drive device connected to a rear end of the rotor and for transmitting torque from a drive stage to the rotor, and a drive connection between the rotor drive device and the beater.

The feed beater is drivingly coupled to the crop separating rotor and, as such, the drive speeds of each are directly proportional to one another during operation. Known separating rotor drive systems typically include a steplessly variable transmission which permits the rotor speed to be varied depending on the harvested crop and conditions. The invention involves the recognition that the separating rotor is typically driven at a slower speed when harvesting crops susceptible to damage such as corn. By coupling the drive of the feed beater to the separating apparatus in accordance with the invention, then the feed beater is also slowed in a relationship that is proportional to the separating apparatus.

The rotor drive device may comprise a transverse driveshaft driven by the drive stage and a gearbox arranged to transfer motion from the transverse driveshaft to the rotor. The gearbox may comprise, for example, a bevel gearing which transfers rotational motion on a transverse axis into rotational motion on a substantially longitudinal axis.

The drive connection preferably comprises a coupling to the gearbox and thus derives a driving torque therefrom. The coupling may comprise a universal joint.

In one preferred embodiment the drive connection comprises a fixed belt drive system having a driving pulley connected to the rotor drive device and a driven pulley connected to the feed beater. Such a belt drive system may comprise a first belt drivingly connecting the driving pulley to an intermediate transfer pulley, and a second belt drivingly connecting the transfer pulley to the driven pulley.

Alternatively, the drive connection may be a shaft drive or a hydraulic drive, the latter having a pump and motor arrangement.

In one embodiment the drive stage is an intermediate drive stage driven by an internal combustion engine. The intermediate drive stage may comprise a drive pulley drivingly connected to the engine via a belt drive, and wherein the drive pulley is drivingly coupled to the rotor drive device via a multi-ratio gearbox.

The drive stage may be positioned on one machine side, wherein the drive connection is arranged on an opposite machine side.

In another preferred embodiment the drive connection comprises a variable ratio transmission to vary the input to output drivespeed ratio of the drive connection. The variable ratio transmission is preferably a stepless variable ratio transmission such as a variator belt drive. Advantageously, the ratio between the operating beater speed and the operating rotor speed can be varied to provide optimized feed and threshing conditions for different crops.

BRIEF DESCRIPTION OF THE DRAWINGS

Further advantages of the invention will become apparent from reading the following description of a specific embodiment with reference to the appended drawings in which:—

DETAILED DESCRIPTION OF SPECIFIC EMBODIMENTS

Relative terms such as 'front', 'rear', 'left', 'right', 'longitudinal' and 'transverse' will be made with reference to the longitudinal axis of a combine harvester travelling in the normal forward direction of travel indicated by arrow F in FIG. 1. The terms 'direction of conveyance', 'upstream', and 'downstream' are made with reference to the general flow of crop material through the combine harvester. The terms 'axial', 'radial' and 'tangential' will be used in relation to the associated rotation axis.

Figure 1:
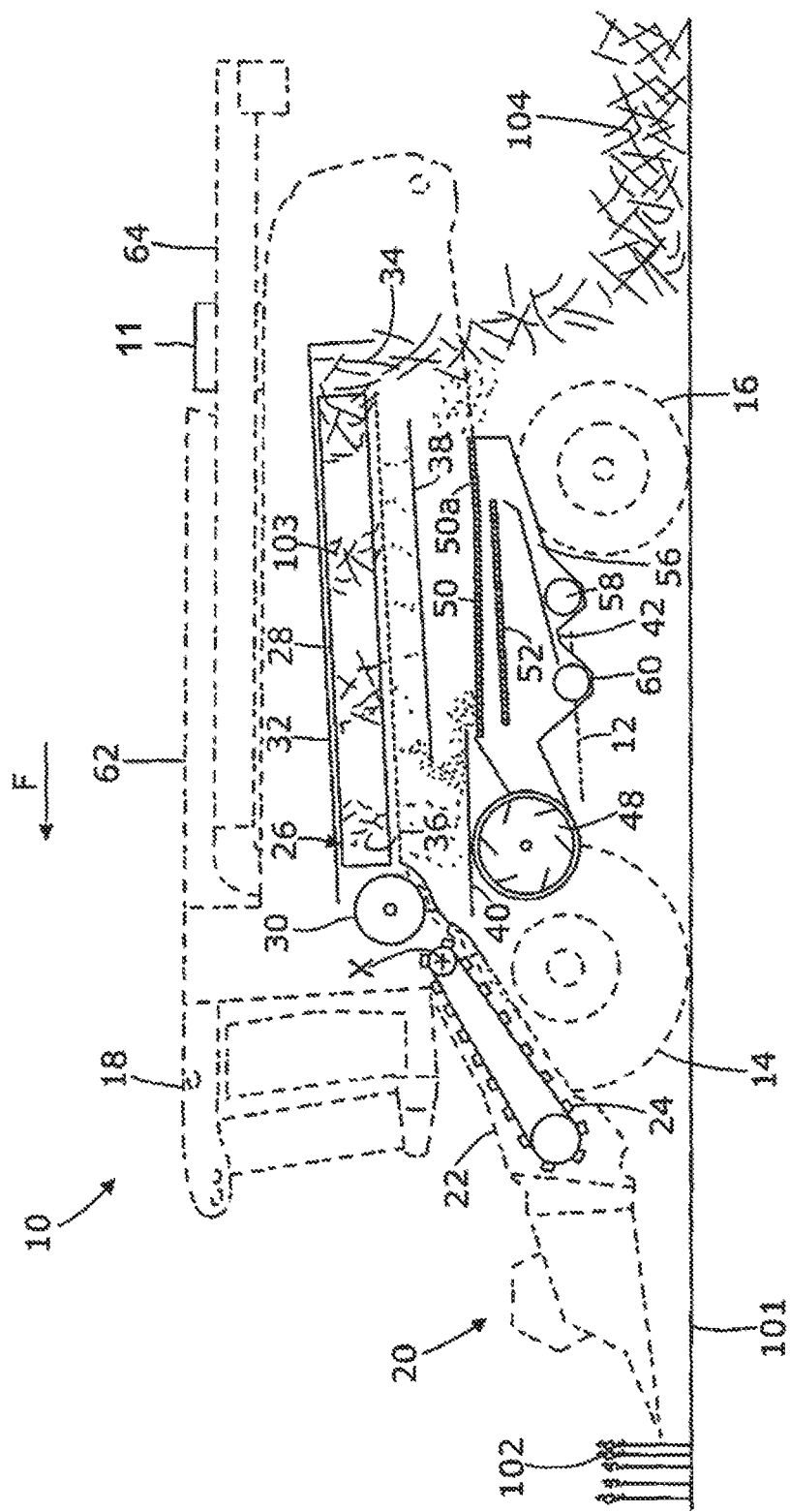
FIG. 1 is a schematic left-side view of combine harvester showing the internal workings thereof.

FIG. 1 illustrates in schematic form the main components of the crop processing systems of a combine harvester 10 and will be used to explain the flow of material below. The crop processing system is shown in solid lines whilst the outline profile of harvester 10 is shown in ghost form. Thereafter, specific embodiments of the invention will be described.

Combine harvester 10, hereinafter referred to as 'combine', includes an internal combustion engine 11 and a frame 12 supported on front wheels 14 and rear steerable wheels 16 which engage the ground 101. A driver's cab 18 is also supported on the frame 12 and houses a driver's station from where a driver controls the combine 10.

A cutting header 20 is detachably supported on the front of a feederhouse 22 which is pivotable about a transverse axis x to lift and lower the header 20 in a conventional manner.

The combine 10 is driven in a forward direction (arrow F) across a field of standing crop 102 in a known manner. The header 20 serves to cut and gather the standing crop material before conveying such as a crop material stream into feederhouse 22. An elevator 24, in the form of a chain and slat elevator, is housed within the feederhouse 22 and serves to convey the crop material stream upwardly and rearwardly from the header 20 to the crop processor designated generally at 26. At this stage the crop material stream is unprocessed.

The crop processor 26 of the illustrated combine 10 includes an axial flow threshing and separating rotor 28 fed by a tangential flow, crop material impelling, feed beater 30.

The feed beater 30 rotates on a transverse axis and comprises crop engaging elements (not shown) which convey the crop material stream under the beater and into rotor housing 32 which houses said rotor 28.

The rotor 28 is positioned to have a generally longitudinal, or fore and aft, rotation axis which is normally inclined upwardly towards the rear of the combine 10.

Flighting elements (not shown) provided on the front end of rotor 28 engage the crop material stream which is then conveyed as a ribbon or mat 103 in a generally rearward axial and helical path in the space between the rotor 28 and the rotor housing 32.

Axial flow rotor 28 serves to thresh the crop stream in a front region, separate the grain therefrom in a rear region, and eject the straw residue through an outlet 34 in the housing 32 at the rear of the machine either directly onto the ground in a windrow 104 as shown, or via a straw chopper (not shown).

A part-cylindrical grate 36 provided in the underside of each rotor housing 32 allows the separated material to fall by gravity onto either a return pan 38 located below a rear section of the processor 26, or directly onto a grain pan 40 located below a front section of the processor 26. In reality the separated material falling through the grate 36 is typically a mix of grain and material other than grain (MOG) which may include chaff, tailings and some straw.

Although the crop processor illustrated comprises a single axial-flow separating rotor, in an alternative embodiment a pair of side-by-side rotors are employed instead.

The return pan 38 and grain pan 40 convey the separated crop material to a grain cleaning shoe designated generally at 42. The grain-MOG mix falls from the rear edge of the grain pan 40 into the cleaning shoe 42 where the cascading mix is subjected to a cleaning airstream generated by fan 48, before falling onto the front of upper sieve or chaffer 50.

Chaffer 50 comprises adjustable louvres supported on a frame which is driven in fore-and-aft oscillating manner. The material which settles on the chaffer 50 is conveyed in a generally rearward direction and the heavier smaller grain-rich material passes between the louvres onto an underlying lower sieve 52, whereas the lighter larger material passes to the end of the chaffer and out of the rear of the machine at 54. A rear section of chaffer 50a is commonly independently adjustable and is configurable to allow unthreshed tailings to pass therethrough into a re-threshing region 56 from where the tailings are conveyed via a re-threshing auger 58 back to the processor 26.

Lower sieve 52 is also driven in an oscillating manner to convey the collected grain-MOG mix rearwardly wherein the material falling therethrough is collected by a clean grain auger 60 for conveyance to an elevator (not shown) for onward conveyance to a grain tank 62. Material which does not pass through lower sieve 52 and is instead conveyed off the rear edge thereof falls into re-threshing region 56 for subsequent re-threshing.

The airstream generated by fan unit 48 is also conveyed by ducting up through lower sieve 52 and chaffer 50 to encourage lifting of the MOG from the chaffer surface.

For completeness the combine 10 includes an unloading system which includes an unloading auger 64.

Figure 2:
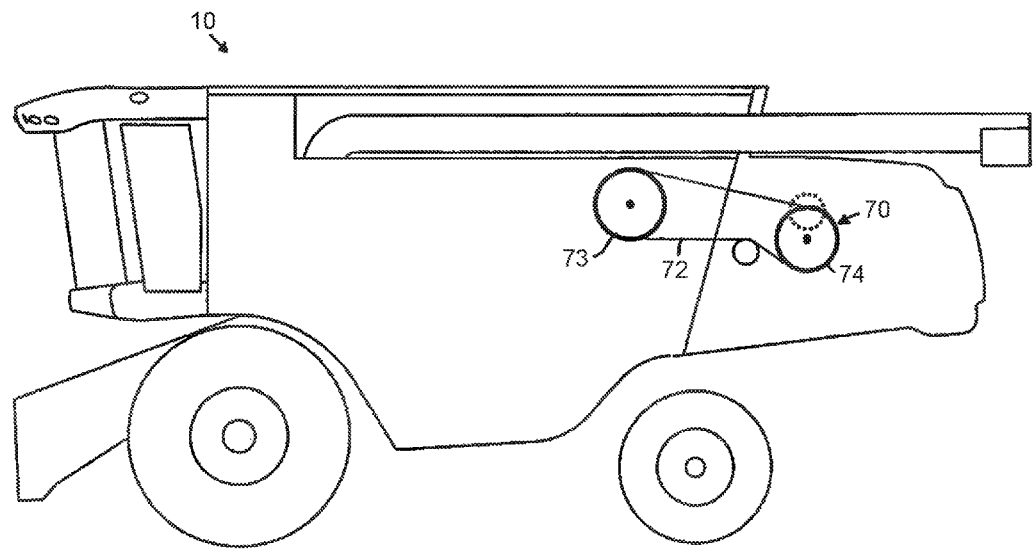
FIG. 2 is a schematic representation of a part of a feed beater drive system of the combine harvester of FIG. 1 according to a first embodiment of the invention, viewed from the left-hand side.
Figure 3:
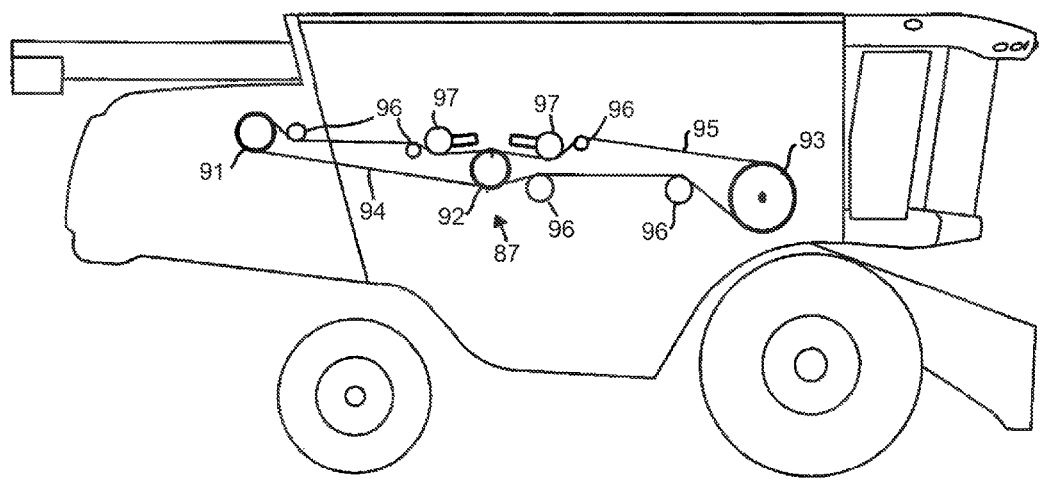
FIG. 3 is a schematic representation of another part of the feed beater drive system of FIG. 2, viewed from the right-hand side.

The invention relates to a drive system for the feed beater 30. An example embodiment will now be described with reference to FIGS. 2, 3 and 4.

The internal combustion engine 11 provides power to drive the propulsion and crop processing systems of the combine 10. A clutch (not shown) allows an operator to selectively engage and disengage the crop processing systems, often collectively termed as the 'threshing gear'.

The crop processing systems include the header 20, elevator 24, processing (or threshing/separating) rotor 28, conveyance pans 38, 40, the cleaning shoe 42, and the clean grain elevator (not shown). These systems may be grouped so as to be driven, engaged and disengaged simultaneously. Each of these systems typically includes a respective intermediate drive stage for transferring power thereto from the engine.

One intermediate drive stage is referenced at 70 and is driven by the internal combustion engine 11 via a variator belt drive 72 positioned on the left-hand side of combine 10. The variator belt drive 72 comprises a V-belt which is trained around a driving pulley 73 and a driven pulley 74. The driving pulley 73 is drivingly connected to the internal combustion engine whereas the driven pulley 74 is keyed onto a driveshaft of the drive stage 70.

The pulleys 73,74 are variator pulleys which are controlled in a known manner to steplessly adjust the rotor drive speed with respect to the engine speed in response to operator commands. It should be appreciated that the rotor drive may comprise alternative variable speed transmission arrangements including a hydrostatic system for example.

It should be understood that the belt drive 72 which delivers power from the engine to the drive stage 70 is illustrated and described by way of example and in a schematic form.

Figure 4:
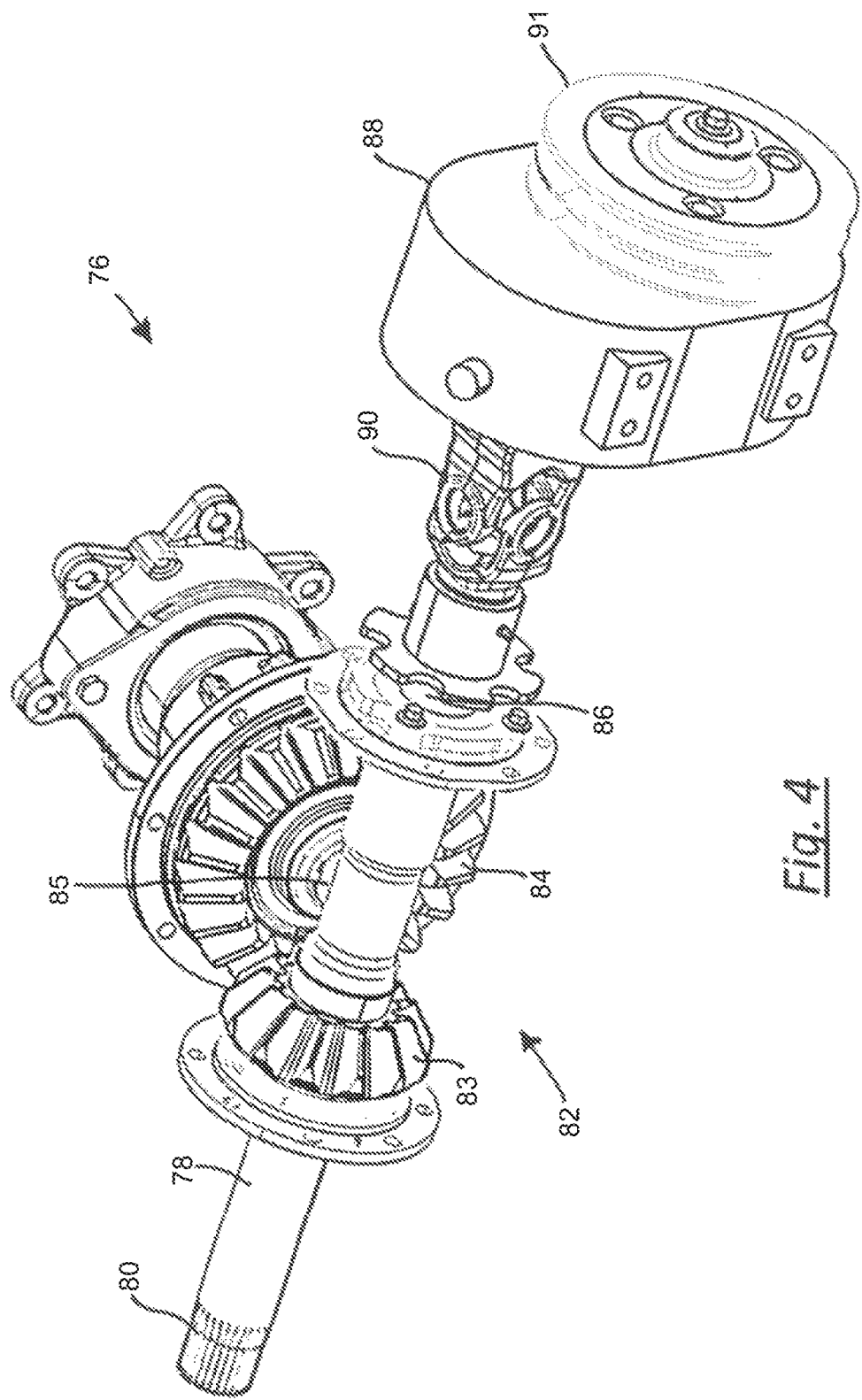
FIG. 4 is a rear right perspective view of a rotor drive device embodied in the feed beater drive system of FIG. 2; and, FIG. 5 is a schematic representation of part of a feed beater drive system according to a second embodiment of the invention viewed.

The drive stage 70 has an output connected to a rotor drive device 76 shown in FIG. 4. In more detail, the rotor drive device 76 comprises a transversely-orientated shaft 78 having a splined portion 80 on the left-hand side to engage a receiving female component (not shown) associated with the drive stage 70. The shaft 78 passes through a rotor gear box referenced generally at 82, the casing of which is omitted from FIG. 4 to reveal the inner workings thereof.

Rotor gearbox 82 comprises a pair of bevel gears 83, 84 for transferring power from the shaft 78 to the rotor 28. A first bevel gear 83 is keyed onto transverse shaft 78 whereas a second bevel gear 84 is keyed onto a rotor shaft 85 which is connected to the rear end of rotor 28. The rotor gearbox 82 is located in the vicinity of crop discharge opening 34.

The casing of rotor gearbox 82 is secured relative to the frame 12 of combine 10. The shaft 78 is journaled to the casing to support the shaft in rotation on a transverse axis coaxial therewith. The shaft 78 passes through the casing of gearbox 82 thus presenting an output stub 86 on the right-hand side.

On the right-hand side of combine 10 (FIG. 3), a drive connection 87 connects the rotor drive device 76 to the beater 30. The drive connection 87 comprises a reduction gearbox 88 coupled via a universal joint 90 to the output stub 86 of shaft 78, and a belt drive system having a 'driving' pulley 91, a pair of intermediate transfer pulleys 92, and a 'driven' pulley 93 connected to the feed beater 30. A first belt 94 is trained around driving pulley 91 and one transfer pulley 92. A second belt 95 is trained around the other of transfer pulley 92 and driven pulley 93. Various idler pulleys 96 and tensioning pulleys 97 are provided as shown.

The drive connection 87 serves to transfer drive from the rotor drive device to the beater 30 thus ensuring a directly proportional driving speed relationship. Therefore, the operating speed of the beater 30 is adjusted together with the speed of the rotor 28 by means of the variator belt drive 72.

Figure 5:
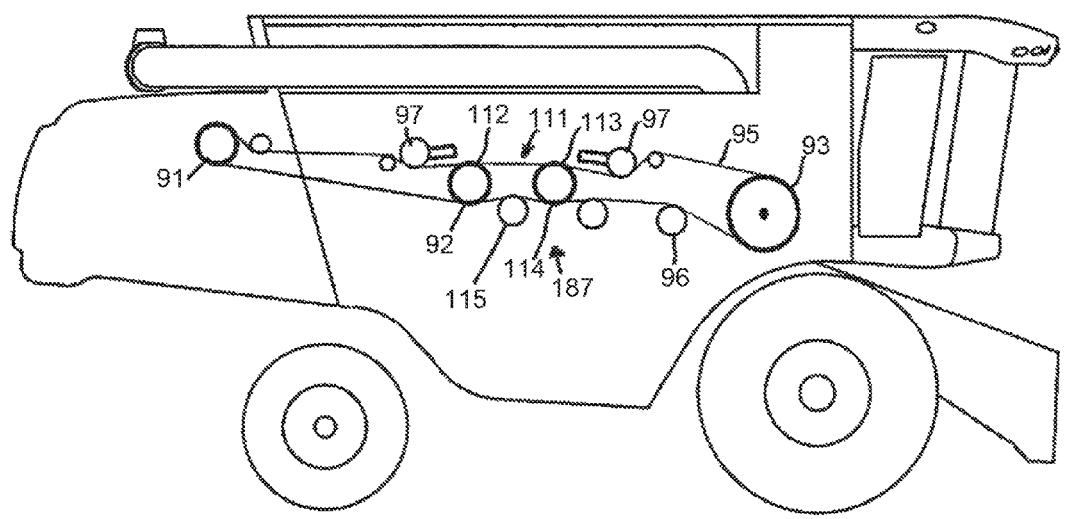

FIG. 5 illustrates a second embodiment in which a drive connection 187 between the rotor drive device 76 and the beater 30 includes a variator belt drive 111. The belt drive includes a first variator pulley 112 which is keyed to the same shaft as intermediatetransfer pulley 92, and a second variator pulley 113 which is keyed to the same shaft as a further intermediate transfer pulley 114. A V-belt is trained around both variator pulleys 112, 113 and tensioned by tensioning pulley 115. Second belt 95 is trained around intermediate transfer pulley 114 and the driven pulley 93.

The variator belt drive 111 is controllable to steplessly adjust the ratio between the rotor speed and the beater speed.

It should be emphasized that the above-described embodiment of the present disclosure is merely a possible example of implementation, merely set forth for a clear understanding of the principles of the disclosure. Many variations and modifications may be made to the above-described embodiment of the disclosure without departing substantially from the spirit and principles of the disclosure.

The invention claimed is:

1. A combine harvester comprising:
   an axial flow crop processor with a rotor mounted for rotation inside a rotor housing and arranged substantially longitudinally with respect to the harvester;
   a feed beater mounted for rotation on a substantially transverse axis and serving to tangentially impel crop material into the crop processor; and,
   a drive system for driving the rotor and feed beater;
   wherein the drive system includes:
   a rotor drive device which is connected to a rear end of the rotor and is configured to transmit torque from a drive stage to the rotor; and,
   a drive connection between the rotor drive device and the beater.

2. A combine harvester according to claim 1, wherein the rotor drive device comprises a transverse driveshaft driven by the drive stage and a gearbox arranged to transfer motion from the transverse driveshaft to the rotor.

3. A combine harvester according to claim 2, wherein the drive connection comprises a coupling to the gearbox.

4. A combine harvester according to claim 3, wherein the coupling comprises a universal joint.

5. A combine harvester according to claim 1, wherein the drive connection comprises a belt drive system having a driving pulley connected to the rotor drive device and a driven pulley connected to the feed beater.

6. A combine harvester according to claim 5, wherein the belt drive system comprises a first belt drivingly connecting the driving pulley to an intermediate transfer pulley, and a second belt drivingly connecting the transfer pulley to the driven pulley.

7. A combine harvester according to claim 1, wherein the drive stage is an intermediate drive stage driven by an internal combustion engine.

8. A combine harvester according to claim 7, wherein the intermediate drive stage comprises a drive pulley drivingly connected to the engine via a belt drive, and wherein the drive pulley is drivingly coupled to the rotor drive device via a multi-ratio gearbox.

9. A combine harvester according to claim 7, wherein the intermediate drive stage is driven by the engine via a stepless variable transmission.

10. A combine harvester according to claim 9, wherein the stepless variable transmission comprises a variator belt drive.

11. A combine harvester according to claim 1, wherein the drive connection comprises a stepless variable transmission.

12. A combine harvester according to claim 11, wherein the stepless variable transmission comprises a variator belt drive.

13. A combine harvester according to claim 1, wherein the drive stage is positioned on one machine side, and wherein the drive connection is arranged on an opposite machine side.

* * * * *